Oct. 26, 1965 R. G. ARMSTRONG 3,213,659
APPARATUS AND METHOD FOR STRAIGHTENING METAL SHAFTS
Filed Jan. 28, 1963

INVENTOR.
ROBERT G. ARMSTRONG
BY
Tillbury & Body
ATTORNEYS 3,213,659
APPARATUS AND METHOD FOR STRAIGHTENING METAL SHAFTS
Robert G. Armstrong, Euclid, Ohio, assignor to The Ohio Crankshaft Company, Cleveland, Ohio, a corporation of Ohio
Filed Jan. 28, 1963, Ser. No. 254,133
11 Claims. (Cl. 72—69)

The present invention pertains to the art of metal working and more particularly to an apparatus and method for straightening metal shafts.

The invention is particularly applicable to an apparatus and method for simultaneously annealing and straightening a shaft of the type used in an automotive transmission and the invention will be discussed with particular reference thereto; however, it is appreciated that the invention has much broader applications and may be used to straighten a shaft which does not require annealing. Further, the invention may be conveniently utilized for straightening other elongated workpieces such as rear axles for automobiles.

The term "shaft" as used herein refers to any of a number of elongated workpieces which may have a variety of cross-sectional shapes and a variety of heads on either end thereof. In other words, the term "shaft" as used herein indicates any tubular or rod-like workpiece which is to be straightened.

Frequently a hardened metal shaft will have a certain amount of transverse run-out which cannot be completely eliminated by machining the shaft; therefore, it is often desirable to straighten such a shaft even though the shaft must be machined before it is ultimately used.

In the past, such hardened shafts were straightened, while the shaft was substantially below the critical temperature of the metal forming the shaft, by mounting the shaft between centers and striking or bending the shaft with an external force. This method required a substantial amount of skill, was inaccurate and was quite time consuming. Further, this method was applicable only when the shaft was not hardened to a great degree because the impact of the hammer would tend to shatter a highly hardened shaft. By so straightening a shaft, non-uniform stresses were induced into the shaft and these stresses were released during use of the shaft causing the shaft to assume, somewhat, the original run-out. Such crude straightening procedures for hardened shafts quite often resulted in surface faults and stress risers which would tend to cause premature failure of the straightened shaft.

To overcome some of the disadvantages concomitant with the above-mentioned method for straightening a hardened shaft, it was proposed to straighten such a hardened shaft after it had cooled substantially below the critical temperature by rotating the shaft against a somewhat fixed wheel which tended to force the shaft into a straightened condition. This method was not completely satisfactory because it required a substantial amount of force so that the machine for carrying out the method was quite large. Further, when a shaft was straightened in such an apparatus, the non-uniform stresses set up in the shaft tended to create the original run-out as the shaft was used.

The above-mentioned disadvantages and others have been completely overcome by the present invention which is directed toward and apparatus and method for straightening a shaft, preferably a previously hardened shaft, while the shaft is heated to a temperature near or above the critical temperature so that the shaft will remain straight during subsequent use thereof.

In accordance with the present invention there is provided an apparatus for straightening a heated shaft having an actual axis extending through the geometric center of the shaft and a neutral axis with which the actual axis must coincide before the shaft is straight, which apparatus comprises, means for rotating the heated shaft about the neutral axis, a restraint movable radially with respect to the neutral axis, means for moving the restraint radially with respect to the shaft to an inward position at which the actual axis is substantially flexed with respect to the neutral axis, and means for gradually moving the restraint radially outward as the heated shaft is rotated thereagainst.

By utilizing this apparatus, substantially all areas of the shaft are periodically flexed back and forth from a state of compression to a state of tension with the flexing amplitude being determined by the distance the actual axis is offset from the neutral axis. By retracting the restraint the stress flexing amplitude is gradually decreased until the actual axis of the shaft substantially coincides with the neutral axis of the shaft and no further stress reversing occurs. In this condition, the shaft is considered "straight" although it is appreciated that the actual axis of the shaft may deviate to a slight extent from the neutral axis of the shaft. Slight run-out of a shaft, in most instances, is not detrimental.

In accordance with another aspect of the present invention, there is provided a method for straightening a shaft having an actual axis extending through the geometric center of the shaft and a neutral axis with which the actual axis must coincide before the shaft is straight. The method comprises heating the shaft between a first temperature slightly below the critical temperature of the metal forming the shaft and a second temperature above the critical temperature of the shaft metal, moving a restraint radially inward with respect to the neutral axis so that the actual axis is deflected transversely therefrom, causing rotation between the shaft and the restraint while the radial spacing of the restraint from the neutral axis is such that the actual axis is offset therefrom and the shaft is subjected to stress reversals, and gradually retracting the restraint until the actual axis substantially coincides with the neutral axis and the shaft ceases to be subjected to stress reversals.

The primary object of the present invention is the provision of an apparatus for straightening heated shafts which apparatus cycles rapidly, does not produce surface faults or non-uniform residual stresses and straightens the shaft very accurately.

Another object of the present invention is the provision of an apparatus for straightening heated shafts which apparatus periodically reverses the stresses in the shaft between compression and tension and gradually decreases the amplitude of the stress reversals until the shaft is concentric with its neutral axis.

Yet another object of the present invention is the provision of an apparatus as defined above wherein the periodic stress reversals set up in the shaft are caused by rotating the shaft against a fixed restraint positioned closer to the neutral axis than one half of the thickness of the shaft.

Another object of the present invention is the provision of a method for straightening a shaft which method includes heating the shaft to a temperature in the range of the critical temperature and then setting up stress reversals in the shaft in a periodic fashion with the amplitude of the reversals gradually decreasing until the actual geometric axis of the shaft is concentric with the neutral axis of the shaft.

These and other objects and advantages will become apparent from the following description used to illustrate the preferred embodiment of the invention as read in connection with the accompanying drawing in which.

Figure 1:
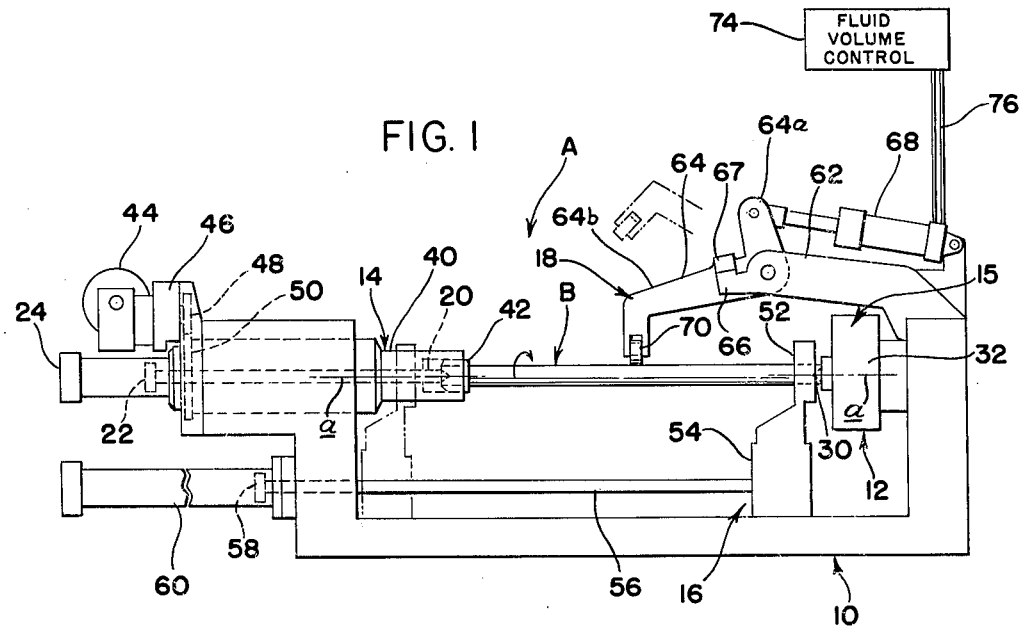
FIGURE 1 is a side elevational, somewhat schematic, view illustrating the preferred embodiment of the present invention.

Referring now to the drawing, wherein the showings are for the purpose of illustrating a preferred embodiment of the invention only and not for the purpose of limiting same, FIGURE 1 shows an apparatus A for straightening a shaft B which shaft may or may not have been previously hardened. The structural details of apparatus A are included only to the extent necessary for illustrating the present invention and various elements have been eliminated for simplicity. The particular configuration of shaft B is not of primary consideration since an apparatus constructed in accordance with the present invention will straighten a variety of elongated workpieces, the most common of which is a shaft having a certain amount of transverse run-out.

In accordance with the preferred embodiment of the invention as shown in FIGURE 1, the apparatus A comprises a base 10 of appropriate construction to support the various components of the apparatus, a support means 12 adapted to support the shaft B between spaced centers which define the neutral axis for the shaft, as will be hereinafter described in detail, first and second means 14, 15 for rotating the shaft about the neutral axis defined by the centers, a heating assembly 16 and a physical restraint 18.

Referring more particularly to the support means 12 which is adapted for supporting the shaft B between two centers, this component of the apparatus disclosed in FIGURE 1 comprises a center 20 reciprocated by a piston 22 operably received within a cylinder 24. Introduction of fluid into the cylinder 24 in a known manner will reciprocate center 20 away from or toward a second center 30 spaced longitudinally from center 20 and driven by rotating means 15 which, in accordance with the preferred embodiment of the present invention, comprises an appropriately driven spindle 32.

The shaft B has provided at both ends thereof recesses which are adapted to receive centers 20, 30 and are so aligned one to the other that when the shaft is supported between the centers 20, 30 these centers define a neutral axis $a$ which should substantially correspond to the actual geometric axis $b$ of shaft B when the shaft is in the desired straightenend condition. Accordingly, a bent shaft, or shaft having undesired run-out, is a shaft wherein the actual axis $b$ of the shaft is transversely or radially offset from the neutral axis $a$. In order to define the proper neutral axis for the shaft B, the recesses on the end of the shaft must be substantially centered with respect to the geometric center of the shaft.

Although the shaft may be rotated by spindle 32, the other end of the shaft is designated, in the preferred embodiment of the present invention, as the driving end and such end is driven by means 14. Although a variety of driving means would come within the intended spirit and scope of the present invention, in accordance with the preferred embodiment of the invention, the driving means 14 comprises a collet 40 which may be moved coaxially with respect to the center 20 for a purpose which will be hereinafter described. Further, the collet is adapted to engage a contractable sleeve 42 which grips the end of shaft B when the collet is actuated by a means which is omitted for simplicity. Adjacent the collet 40 there is provided a motor 44 connected to the collet through a transmission 46, a pinion gear 48 and a drive gear 50 so that rotation of the motor will rotate the collet and thus the shaft B. To prevent substantial torque being developed as shaft B is rotated by collet 40, it is within the contemplation of the present invention to rotate the spindle 32 at substantially the same speed as the collet 40. It is appreciated that either drive means 14 or 15 may be used separately to drive shaft B or they may be used in combination as shown in the embodiment of FIGURE 1. Various changes may be made in the apparatus as so far described so that it may support and rotate other elongated workpieces, such as automotive axles.

In accordance with the present invention, there is provided a means for heating the shaft B to a temperature at least as high as the critical temperature of the metal forming the shaft. By heating the shaft B to a temperature in the critical range, the shaft becomes somewhat pliable and may be plastically deformed in a transverse direction as it is subjected to a stress greater than the yield point by a force exerted against the side of the shaft. If the temperature of the shaft were substantially below the critical temperature of the material forming the shaft, the shaft would be only elastically deformed by a radial force unless the radial force reaches a substantial value. Accordingly, for reasons to be discussed later, the present invention is particularly applicable to straightening a shaft after it has been heated to a temperature in the range of or above the critical temperature of the material forming the shaft.

Although a variety of devices could be utilized in raising the temperature of the shaft, in accordance with the preferred embodiment of the present invention as shown in FIGURE 1, the heating assembly 16 is an induction heating device and comprises a single turn inductor 52 concentrically mounted with respect to the neutral axis defined by centers 20, 30 and carried by a support 54 adapted to slide along the frame 10. Of course, the inductor 52 is powered by appropriate alternating current source which has been omitted for simplicity. Reciprocation of the support 54 along the frame 10 is accomplished, in accordance with the preferred embodiment of the present invention by a rod 56 connected onto the support and having a piston 58 operably received within cylinder 60. By appropriate control of fluid in the cylinder 60, the support 54 and, thus, the inductor 52 can be progressed along the complete length of shaft B. As the inductor 52 approaches its phantom line position shown in FIGURE 1, collet 40, in accordance with the preferred embodiment of the present invention, is retracted so that it will not interfere with the complete movement of the inductor along the shaft. By so constructing the heating assembly 16, the inductor progressively heats the shaft B as it scans from one end to the other.

Referring in more detail to the mechanical restraint 18 as shown in FIGURES 1–4, this restraint, although it may take various structural embodiments, is illustrated as including a bracket 62 supported onto frame 10, a bell crank 64 pivotally mounted onto the bracket and having oppositely extending legs 64a, 64b and a stop 66 mounted on the bracket and adapted to coact with a stop 67 on the leg 64b to limit the amount of pivotal movement of the bell crank toward the shaft B. The position of stop 66 will allow flexing of shaft B and stress reversal therein as is hereinafter described in detail.

Figure 4:
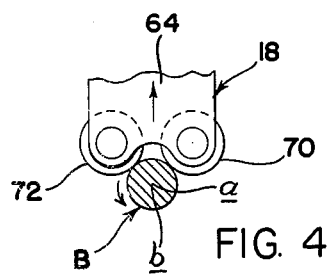
FIGURE 4 is a partial, somewhat schematic, view taken generally along line 4—4 of FIGURE 3.

To pivot the bell crank 64 toward and away from shaft B there is provided, in accordance with the preferred embodiment of the present invention, a fluid operated cylinder 68 extending between frame 10 and the leg 64a. The lower end of leg 64b is provided with a pair of nesting, contact rollers 70, 72 mounted to rotate about axes generally parallel to neutral axis $a$. The nesting contact rollers 70, 72 are so positioned that when the bell crank 64 is pivoted toward the shaft B the rollers engage the surface of the shaft on opposite sides of the axes $a$, $b$, as is shown in FIGURE 4. In order to force the restraint 18 into engagement with the surface of shaft B, there is provided a fluid volume control 74 having a first control means adapted to control the initial position of rollers 70, 72 with respect to the neutral axis *a*. Another operating characteristic of the fluid volume control, which may be a separate means or included as part of the first-mentioned control, allows the rollers 70, 72 to be gradually retracted from their inwardmost position in contact with the surface of shaft B. Accordingly, the control 74 moves the restraint 18 inwardly a given extent and, on a given signal, the control allows the restraint to gradually move outwardly from the neutral axis *a*.

In operation, the shaft is heated to the desired temperature and rotated by means 14, 15. When the shaft B is bent, or has run-out, the actual geometric axis *b* of the shaft is displaced radially with respect to the neutral axis extending between centers 20, 30.

To straighten the heated shaft B, fluid control 74 is appropriately actuated so that a given volume of fluid is forced through line 76 into cylinder 68 which forces the rollers 70, 72 against shaft B. The stop 66 allows restraint 18 to move radially inwardly with respect to the neutral axis *a* so that the shaft is flexed a distance *c* which is defined as the distance between the neutral axis *a* and the actual geometric center of axis *b* of shaft B. As the shaft rotates against restraint 18 all portions of the shaft flex back and forth between a state of compression and a state of tension. The periodic flexiing is defined as "stress reversals" with the amplitude of reversal being determined by amplitude *c* which may be referred to as the "stress flexing amplitude." Since the shaft is heated to a somewhat plastic state, the shaft can easily flex back and forth between compression and tension. The initial operation of the apparatus A is shown in FIGURE 2 wherein the stress flexing amplitude is *c*.

Figure 3:
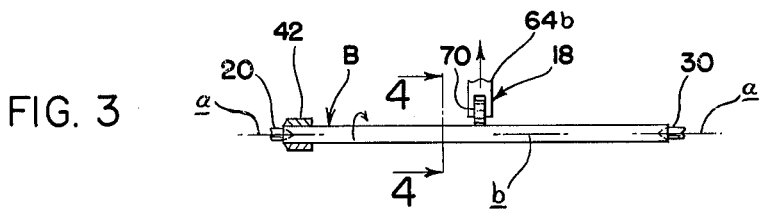
FIGURE 3 is a diagrammatical view illustrating the final operation of the preferred embodiment as shown in FIGURE 1.

By appropriate programming of the control 74, restraint 18 is gradually moved radially outwardly with respect to the neutral axis *a* and the stress flexing amplitude *c* is correspondingly reduced so that the neutral axis *a* and the actual axis *b* tend to approach each other. As was mentioned before, when the neutral axis and actual axis coincide, the shaft is straightened. This condition is shown in FIGURE 3 wherein the control 74 has retracted the restraint 18 until the neutral axis and the actual axis of shaft B correspond and the stress flexing amplitude *c* is eliminated. Accordingly, in the position shown in FIGURE 3, as shaft B is rotated there is no periodic flexing of the shaft between compression and tension as is the case when the restraint 18 is moved inwardly toward the neutral axis *a* a distance less than the radius of shaft B.

The same apparatus and method as defined above can be utilized in annealing and straightening a hardened shaft or it may be used for straightening a metallurgically soft shaft. In essence, the shaft is heated and then stressed back and forth in periodic fashion between a state of compression and a state of tension with the stress flexing amplitude gradually decreasing until the amplitude is substantially zero and the actual axis of shaft B coincides with the neutral axis *a*.

Figure 2:
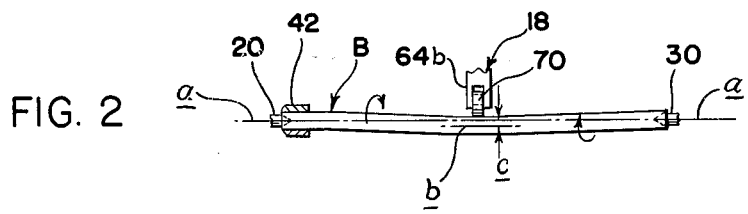
FIGURE 2 is a diagrammatical view illustrating the initial operation of the preferred embodiment as shown in FIGURE 1.

It is appreciated that the initial flexing amplitude as shown in FIGURE 2 may be substantially greater than the run-out of the shaft so that there is no necessity for changing the initial flexing amplitude according to the particular amount of run-out found in the shaft. This greatly simplifies the operation of the apparatus. Further, the restraint may rotate about the neutral axis *a* while the workpiece or shaft B remains stationary or rotates at a different speed.

By straightening a shaft in accordance with the present invention, the shaft does not have non-uniform residual stresses that may be relieved during use so that the shaft assumes its original shape. Further, there are no surface faults which can cause stress concentrations which would result in premature failure of the shaft.

The present invention has been described in conjunction with certain structural details; however, it is appreciated that various changes may be made in the structural features utilized in illustrating the invention without departing from the intended spirit and scope of the present invention as defined in the appended claims.

Having thus described my invention, I claim:

1. A method of straightening a shaft comprising the following steps: heating the shaft to a somewhat pliable condition, periodically and repeatedly stressing substantially all portions of the shaft between a state of compression and a state of tension by rotating said shaft with respect to a physical restraint the position of which determines the flexing amplitude, gradually decreasing the flexing amplitude by moving said restraint with respect to said heated shaft until said amplitude is substantially zero, and allowing said shaft to cool.

2. A method as defined in claim 1 wherein said shaft is heated to a temperature between a first temperature slightly below the critical temperature of the material forming the shaft and a second temperature above said critical temperature.

3. A method of straightening a metal shaft comprising the following steps: heating the shaft, forcing a restraint transversely against the shaft to radially deflect said shaft, rotating said shaft about a desired axis while said restraint is against said shaft, and, thereafter, gradually moving said restraint radially outward with respect to said shaft.

4. The method as defined in claim 3 wherein said shaft is heated to a temperature between a first temperature slightly below the critical temperature of the metal forming said shaft and a second temperature above said critical temperature.

5. A method of straightening a shaft having an actual axis extending through the geometric center of said shaft and a neutral axis with which the actual axis must coincide before the shaft is straight, comprising the following steps: heating said shaft to a temperature between a first temperature slightly below the critical temperature of said shaft and a second temperature above said critical temperature, forcing a restraint transversely inward against said shaft to stress said shaft beyond its yield point rotating said shaft against said stressing restraint so that the shaft is periodically stressed between a state of compression and a state of tension with the stress flexing amplitude being determined by the transversely inward movement of said restraint, gradually retracting said restraint until the stressing of the shaft has substantially ceased and allowing said shaft to cool.

6. A method of straightening a metal shaft having an actual axis extending through the geometric center of said shaft and a neutral axis with which said actual axis must coincide before said shaft is straight, comprising the following steps: heating said shaft to a temperature between a first temperature slightly below the critical temperature of said shaft and a second temperature above said critical temperature, moving a restraint radially inward with respect to said neutral axis so that said actual axis is deflected, causing rotation between said shaft and said restraint while the radial spacing of said restraint from said neutral axis is such that said actual axis is periodically stressed between a state of compression and a state of tension, gradually retracting said restraint until the stressing of the shaft has substantially ceased and allowing said shaft to cool.

7. Apparatus for straightening a shaft including means for heating said shaft into a plastic condition, a mechanical restraint, power means for moving said restraint transversely against said shaft to radially deflect same, means for rotating said shaft against said restraint and control means for gradually retracting said restraint from said shaft.

8. An apparatus as defined in claim 7 wherein said means for heating said shaft is an inductor concentric with respect to said shaft, means connecting said inductor across an alternating power source and means for progressing said inductor along said shaft.

9. An apparatus as defined in claim 7 including means for pivotally mounting said restraint and said power means connected to said restraint to pivot same against said shaft.

10. An apparatus as defined in claim 7 wherein said control means includes a volume responsive, fluid operated motor connected to said restraint and means for controlling the amount of fluid in said motor.

11. An apparatus for straightening a heated shaft having an actual axis extending through the geometric center of said shaft and a neutral axis with which said actual axis must coincide before said shaft is straight, comprising, in combination, means for rotating said heated shaft about said neutral axis, a restraint movable radially with respect to said neutral axis, means for moving said restraint radially with respect to said shaft to an inward position at which said actual axis is substantially flexed with respect to said neutral axis while said shaft is rotating against said restraint, and means for gradually moving said restraint radially outward from said neutral axis as the heated shaft is being rotated thereagainst.

References Cited by the Examiner
UNITED STATES PATENTS

| | | | |
|---|---|---|---|
| 2,040,442 | 5/36 | Nieman | 153—54 |
| 2,364,443 | 12/44 | Hornbostel | 73—141 |
| 3,102,576 | 9/63 | Schilberg | 153—86 |

CHARLES W. LANHAM, *Primary Examiner.*